UNITED STATES PATENT OFFICE.

WILLIAM ZINSSER, OF NEW YORK, N. Y.

IMPROVEMENT IN COMPOUNDS FOR TREATING MALT LIQUORS.

Specification forming part of Letters Patent No. 109,990, dated December 6, 1870; reissue No. 5,057, dated September 10, 1872.

*To all whom it may concern:*

Be it known that I, WILLIAM ZINSSER, of the city, county, and State of New York, have invented a new and useful Improvement in Compounds for Treating Malt Liquors; and I do hereby declare the following to be a full, clear, and exact description thereof, which will enable those skilled in the art to make and use the same.

This invention relates to a compound made of bicarbonate of soda or potash and a glutinous substance—such as gum Arabic, gum gedda or gum Senegal, with or without sugar—which, when properly mixed and dissolved in beer or other fermented malt liquors, evolves carbonic acid, the acid contained in such malt liquors serving to decompose the bicarbonate of soda, and by these means the acid contained in the malt liquor is neutralized, while the gum mixed with the compound serves to impart substance to the foam. With the bicarbonate and the gum may also be mixed a suitable quantity of organic acid—such as tartaric acid—in a dry state, so that when the compound is introduced into the malt liquors the evolution of carbonic acid is promoted, and by the gum the foam produced is rendered substantial and durable.

In preparing my compound I take bicarbonate of soda or potash, eight parts; gum Arabic, two parts; sugar, one part; and when tartaric acid is added the proportion is as follows: bicarbonate of soda or potash, eight parts; tartaric acid, two parts; gum Arabic, two parts; sugar, one part. These proportions may, however, be changed according to the purity of the materials, and according to the liquid to be treated. The several ingredients are ground together, so that they become intimately mixed, and that a fine powder is obtained which can be readily mixed with the liquor. In place of gum Arabic I can use gum gedda or gum Senegal, or any other glutinous material innoxious to the consumer. Sugar may be used with my compound to counteract its taste.

When the mixture of bicarbonate of soda or potash with gum is introduced into beer or other fermented malt liquors the acid contained in the beer decomposes the bicarbonate, and thereby said acid is neutralized and the carbonic acid evolved from the bicarbonate increases the effervescence of the beer. This effect is still more apparent if the compound contains tartaric acid or its equivalent, as above stated.

If the beer is poured into a tumbler or drawn from a barrel the foam formed on its surface is rendered stiff and durable by the gum which is held in solution by the acid evolved from the bicarbonate of soda or potash. Furthermore, beer or other malt liquors, when mixed with my compound, become perfectly clear, and the acid evolved from the bicarbonate imparts to the same life, so that they can be drawn from the barrel without delay.

What I claim as new, and desire to secure by Letters Patent, is—

1. A compound for treating malt liquors made of bicarbonate of soda or potash and gum Arabic or its equivalent, substantially as described.

2. A compound for treating malt liquors made of bicarbonate of soda or potash, tartaric acid or its equivalent, and gum Arabic or its equivalent, substantially as described.

WM. ZINSSER.

Witnesses:
W. HAUFF,
E. F. KASTENHUBER.